March 5, 1929.  W. WAHL  1,704,310
EMERGENCY VALVE ASSEMBLY.
Filed May 8, 1928  2 Sheets-Sheet 1

Inventor
William Wahl

By Clarence A. O'Brien
Attorney

March 5, 1929.  W. WAHL  1,704,310
EMERGENCY VALVE ASSEMBLY
Filed May 8, 1928  2 Sheets-Sheet 2
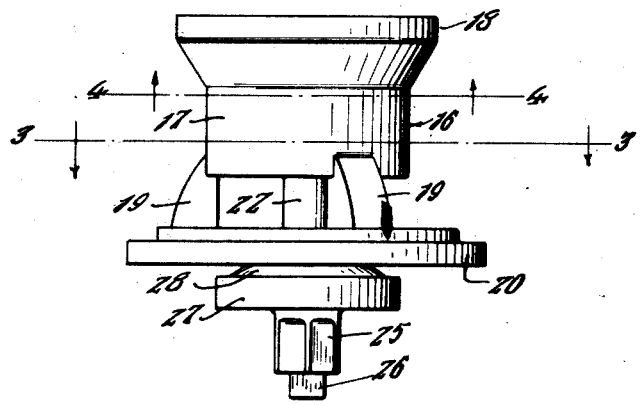
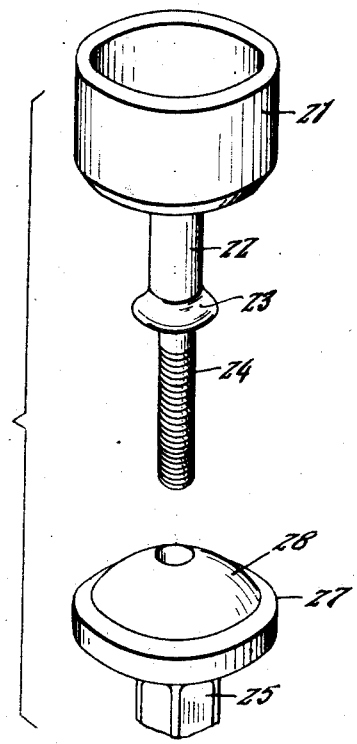
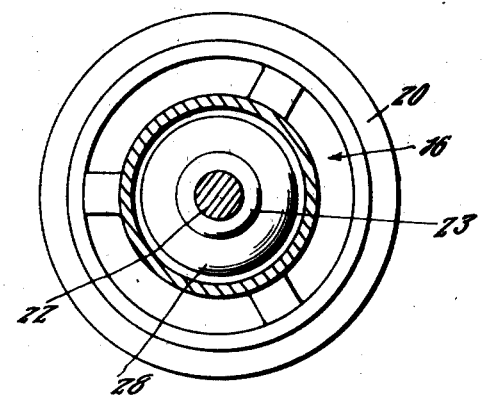
Inventor
William Wahl
By Clarence A. O'Brien
Attorney Patented Mar. 5, 1929.

1,704,310

UNITED STATES PATENT OFFICE.

WILLIAM WAHL, OF HAMMOND, INDIANA.

EMERGENCY-VALVE ASSEMBLY.

Application filed May 8, 1928. Serial No. 276,131.

The present invention relates to an improved valve structure which may be conveniently entitled as a unit, as an emergency valve assembly, the same being adapted for use in association with a conventional triple valve "Westinghouse" employed as a part of the type "K" air brake equipment.

In the present triple valve structure, the emergency parts, which are of separate construction are liable to various defects, some of these being as follows.

The emergency parts are usually sold separately and sometimes vary in size, and when assembled by unskilled labor, the parts do not fit properly, and set up undue friction, produce too much resistance, and thereby interfere with closing, after an emergency application of the brakes.

The present day emergency valve has a portion extending down into a socket in a spring pressed check valve, and this extended portion is frequently bent in disassembling for repairs, thereby making it unsuitable for efficient operation.

Then too, the emergency valve has a disc like portion carrying a flat rubber seat, and when is bent prevents proper closing. The emergency valve seat is often tipped, caused by the check valve casing not being drawn down in proper alignment, binding the emergency piston when applied in emergency, holding the emergency valve off of its seat.

The emergency piston is loose and the vibration of the car in transit causes it to move up and down, thereby wearing the guide in the emergency valve seat and allowing the emergency piston to tip, often bending the emergency valve or causing the piston to stick in its bushing.

If the emergency parts are held open by any of the foregoing defects, the air will flow directly through the chambers Y and X to the brake cylinder, the triple valve being in release cannot release fast enough through the small ports to overcome the brake pipe pressure coming into the brake cylinder and thereby holding the cylinder piston out which holds the brakes tight to the wheels and causes them to slide and flatten.

From experience with emergency valve parts in the triple valve mentioned, I find these defects and objections quite evident and characteristic, for which reason I have evolved and produced a substitute emergency valve assembly which will overcome these outstanding defects.

The advantages of the improved valve assembly are as follows:

The structure would be assembled before selling, securing a proper fitting and assuring the parts to be in proper relationship.

The stem of the improved emergency valve does not extend into the socket of the check valve to permit bending in any way by disassembling the parts.

The emergency valve, as improved, embodies a convex rubber seat insuring more efficient closing.

The structure being in one piece, when assembled does not move when the train is in transit and this prolongs the wear of the parts.

Important features of the valve assembly embody a cylindrical guide bushing and a correspondingly shaped cupped valve stem guide which prevents slipping and angling and secures a more dependable and sensitive action.

The foregoing and other features and advantages of the invention will become more readily apparent from the following description and drawings.

In the drawings:

Figure 2 is an elevation view showing the complete improvement as it is sold and assembled before installation.

Figure 3 is a cross section taken approximately upon the plane of the line 3—3 of Figure 2.

Figure 5 is a perspective view of the cupped cylindrical guide and the cooperating emergency valve.

Figure 1:
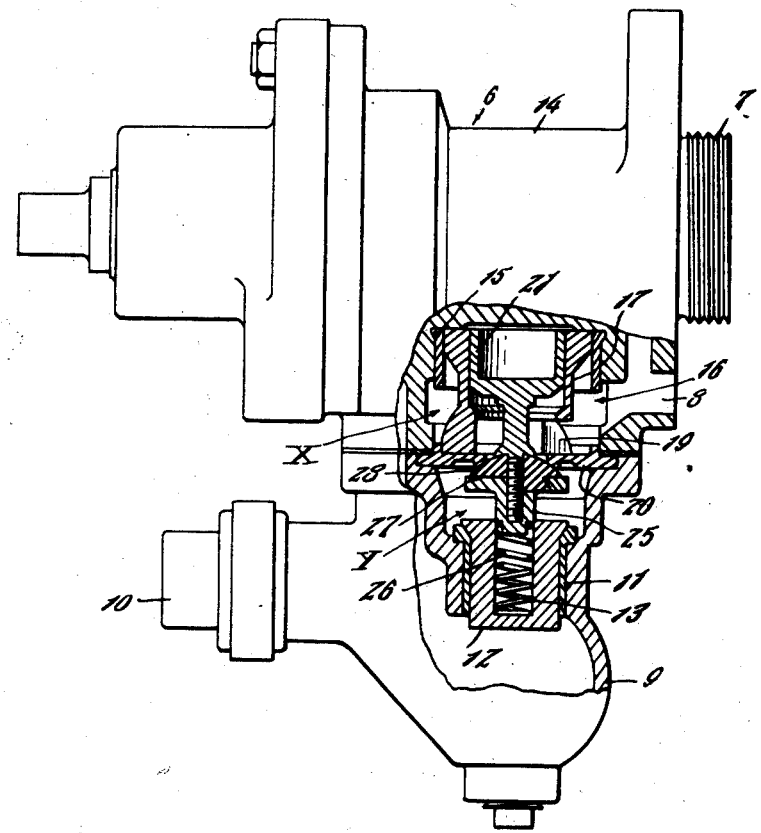
Figure 1 is a side view of a Westinghouse type A triple valve with portions broken away and shown in section to expose the improved valve structure or assembly.
Figure 4:
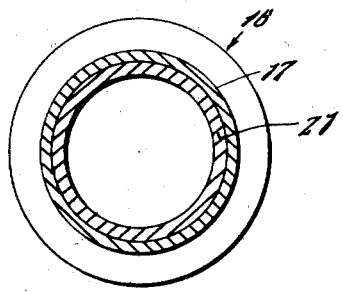
Figure 4 is a similar section, taken on the line 4—4 of Figure 2.

Referring now to the drawings by numerals, it will be observed that the reference character 6 designates generally a conventional type K Westinghouse triple valve having a threaded connection for the auxiliary reservoir, and having a discharge opening 8 in communication with the pipe which extends through the reservoir and which communicates with the brake cylinder. The valve includes the conventional bottom casting 9 having a brake pipe connection 10 equipped with an internal partition having a sleeve 11, in which the usual check valve 12 is slidable. This check valve is provided with customary centralized sockets having a coil spring 13 located therein. In addition, the upper casting 14 has the usual ring like bushing 15. These parts are of conventional form and constitute no part of the invention except in combination therewith.

The improved emergency valve assembly is shown in Figure 2 and comprises a special fitting, 16, embodying a guide bushing 17 and an upper flared end portion 18, the latter fitting within the aforesaid ring like part 15, as shown in Figure 1.

Formed on the bottom are circumferentially spaced lugs or feet 19 resting upon the annular emergency valve seat 20. This element is clamped between the upper and lower castings of the triple valve as shown in Figure 1 and has the usual centralized air opening with a bevelled valve seat, the latter feature being a revision. Slidable within the bushing 17 is a cylindrical cupped guide 21, having a stem 22, provided with an intermediate outstanding flange 23, and a screw threaded end portion 24. The screw threaded portion 24 is tapped into the screw threaded socket formed in the emergency valve guide stem 25. This stem is provided on its bottom with a reduced extension 26 extending telescopically into the coil spring 13. The relationship of these parts with respect to the socket and check valve 12 is to be noted. Clamped between the disc like head 27 on the stem 25 and the flange 23 is a convex rubber valve element cooperating with the bevelled valve seat in the part 20.

In operation, it is understood that the air from the brake pipe enters the triple valve, forcing the main piston (not shown) back which allows the air to flow through the feed groove to the auxiliary reservoir and this also raises the check valve 12, permitting the air to enter the chamber Y, until the pressure becomes equal to that in the brake pipe.

At this time we have equal pressure on either side of the main piston.

Quick action is now caused by a sudden and considerable reduction in the brake pipe pressure below that in the auxiliary reservoir. The reduction of the brake pipe pressure causes the pressure in the auxiliary reservoir to be the greater, which forces the main piston to move forward and the result of this movement, causes the slide valve to open forth in the slide valve seat and allows the air from the auxiliary reservoir to flow down into the cup 21, forcing this down and removing the emergency valve from its seat, thus allowing the pressure in the chamber Y to be instantly relieved, allowing the brake pipe pressure to raise the check valve 12. The brake pipe air now flows through chambers Y and X to the brake cylinder until the brake cylinder and brake pressure are about equalized and it is thought that by considering the description in connection with the drawings, a clear understanding of the construction, operation and advantages of the invention will be had. Therefore, a more lengthy description is regarded unnecessary.

Minor changes in the shape, size and materials may be resorted to, without departing from the spirit of the invention or the scope of the adjoined claims.

I claim:

1. An emergency valve assembly for use in connection with a triple valve of the class described comprising an annulus having a central opening surrounded by a bevelled valve seat, a fitting embodying a cylindrical guide bushing and circumferentially spaced lugs resting in contact against one side of the annulus, a cupped guide element slidable in said bushing and including a depending stem having a reduced screw threaded extension, an emergency valve including a screw threaded socket receiving said extension, and also including a convex valve element cooperable with said valve seat.

2. An emergency valve assembly for use in connection with a triple valve of the class described comprising an annulus having a central opening surrounded by a bevelled valve seat, a fitting embodying a cylindrical guide bushing and circumferentially spaced lugs resting in contact against one side of the annulus, a cupped guide element slidable in said bushing and including a depending stem having a reduced screw threaded extension, an emergency valve including a screw threaded socket receiving said extension and also including a convex valve element cooperable with said valve seat, said emergency valve also embodying a disc like head upon which said valve element is disposed and further including a centralized depending guide stem equipped with a reduced extremity.

In testimony whereof I affix my signature.

WILLIAM WAHL.